UNITED STATES PATENT OFFICE.

CHARLES VAUCHER AND RENÉ SPEITEL, OF BASEL, SWITZERLAND, ASSIGNORS TO THE SOCIETY DURAND & HUGUENIN S. Q., OF BASEL, SWITZERLAND.

HALOGEN DERIVATIVES OF BASIC ACRIDINE DYESTUFFS AND PROCESS OF MAKING SAME.

1,418,852.     Specification of Letters Patent.     Patented June 6, 1922.

No Drawing.     Application filed June 13, 1921. Serial No. 477,263.

*To all whom it may concern:*

Be it known that we, CHARLES VAUCHER, a citizen of the Swiss Republic, and RENÉ SPEITEL, a citizen of the French Republic, both residents of Basel, Switzerland, have invented new and useful Halogen Derivatives of Basic Acridine Dyestuffs and Processes of Making Same, of which the following is a full, clear, and exact specification.

It has been found that when basic acridine dyestuffs are treated with halogen, or with an agent which liberates halogen, they are transformed into new halogenated products which dye much redder shades than do the original dyestuffs.

Halogenated acridine dyestuffs are referred to in the specification of Letters Patent No. 1,255,739 of the United States of America. These were prepared by employing halogenated intermediate products in their manufacture, for example, by the condensation of 1-amino-3-formyl-amino-6-chlorobenzene and 3 amino-dimethyl-aniline hydro-chloride. In this way a dyestuff is obtained which dyes leather clear reddish-yellow shades. The said preparation chiefly relates to mono-halogenized products.

According to the process of the present invention new halogenated dyestuffs, differing from those described in the aforesaid specification, are obtained by the simpler method of direct treatment of basic acridine dyestuffs, as such or in the form of their leuco derivatives, with halogen. The new products contain more than one atom of halogen in the molecule and dye leather, and also, and especially, tannin-mordanted cotton red-orange to pure red shades.

The advantage of the new dyestuffs is their use in connection with calico printing. Apart from the fact that their shades constitute a very welcome addition to the color scale, they are valuable on account of their fastness against chlorine, whereas the ordinary non-halogenated basic acridine dyestuffs, when printed with tannin on cotton, suffer an appreciable alteration of shade by chlorine. Under the same conditions the new halogenized acridine dyestuffs, which are to some extent saturated with halogen, do not change in shade, and are fast against the action of chlorine.

The said new dyestuffs can also be advantageously applied to leather dyeing and to dyeing natural, or artificial, silk.

The action of halogen on the said dyestuffs can take place in various ways, preferably in a suitable diluent.

The process is illustrated by the following examples:

Example 1.

An intimate mixture of 20 grams of acridine orange sulfate

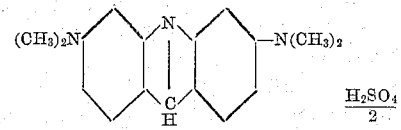

and 35 grams of sodium bromide is slowly stirred into 400 grams of concentrated sulfuric acid at zero centigrade stirring being continued at this temperature for several hours. It is then slowly heated to 50° centigrade until a sample dissolves in water with a vivid red color whereupon it is poured on to ice and salted out and filtered, the dyestuff being afterwards washed with salt water, and dried at about 60° centigrade.

See Schultz, Farbstofftabellen, 5th Edition Nr. 603.

The analysis of this product indicate a dibromo-derivative. The said product dyes pure red shades on tannin-mordanted cotton and on leather.

Example 2.

18 grams of finely powdered acridine orange sulfate (the dyestuff used as parent material in example 1) are suspended (or the corresponding quantity of base is dissolved) in 100 grams of nitro-benzol, and 8 grams of bromine are added slowly, in small portions at a time, at about 10° centigrade, the mixture being kept stirred. A solution of 1.8 grams of sodium chlorate is then dropped in at a low temperature. The heat of reaction causes the temperature to rise to from 30° to 35° C., and as soon as it begins to recede, the mixture is heated to 100° C. for an hour.

On cooling, the crystals are filtered off, washed with a little alcohol, then treated with dilute alkali, and the base is dissolved in water to which the necessary quantity of hydrochloric acid has been added. From the solution the dyestuff is separated by an addition of common salt, pressed and dried.

In this example, the sodium chlorate may be replaced by double the quantity of bromine.

The resulting dyestuff appears to be identical with that of the foregoing Example 1.

*Example 3.*

Chlorine is passed, at a low temperature, into a solution of 18 grams of leuco-tetramethyl-diamino acridine sulfate in 300 grams of sulfuric acid (of from 10 to 20 per cent strength) until a precipitate just commences to form, whereupon the mixture is filtered, precipitated with sodium chloride and again filtered, the precipitate being washed with salt water and dried at 60° centigrade.

In this example, the chlorine first oxidizes and then chlorinates. The chlorine gas may be replaced by an agent liberating chlorine such, for example as a hypochlorite solution of known strength in presence of hydrochloric acid.

What we claim is:

1. The herein described process for the manufacture of new halogen derivatives of basic acridine dyestuffs consisting in treating the said acridine dyestuffs with a halogen.

2. The herein described process for the manufacture of new halogen derivatives of basic acridine dyestuffs consisting in acting with a halogen on the said acridine dyestuffs in a diluent.

3. As new products the herein described new halogen derivatives of basic acridine dyestuffs, containing more than one atom of halogen in the molecule, dyeing leather and tannin-mordanted cotton red-orange to pure-red shades, fast to chlorine and being also applicable to dyeing natural and artificial silk.

4. As a new article of manufacture the herein described dibromo-derivative of acridine orange

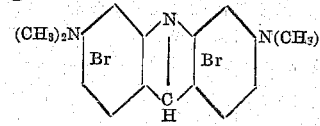

which dyes leather and tannin-mordanted cotton pure-red shades fast to chlorine.

In witness whereof we have hereunto signed our names this 1st day of June 1921, in the presence of two subscribing witnesses.

CHARLES VAUCHER.
RENÉ SPEITEL.

Witnesses:
FRISHER KURZ,
AMAND RITTER.